United States Patent [19]

Reeberg

[11] 4,328,917
[45] May 11, 1982

[54] HOLD STEADY STRAPS

[76] Inventor: Christiaan Reeberg, 111-67 145 St., Jamaica, N.Y. 11435

[21] Appl. No.: 221,618

[22] Filed: Dec. 31, 1980

[51] Int. Cl.³ .............................................. G03B 17/00
[52] U.S. Cl. .................................. 224/254; 354/293; 224/255; 224/256; 224/257; 224/908
[58] Field of Search ................... 354/81, 82, 288, 293; 24/2.5, 364; 224/150, 207, 254–258, 908

[56] References Cited

U.S. PATENT DOCUMENTS

| | | | |
|---|---|---|---|
| 2,357,363 | 9/1944 | Smith et al. | 224/150 |
| 2,771,826 | 11/1956 | Shapiro | 354/293 X |
| 2,830,747 | 4/1958 | Creste | 224/150 |
| 3,984,855 | 10/1976 | Baczynsky | 354/293 |
| 4,155,636 | 5/1979 | Reeberg | 354/293 |
| 4,249,686 | 2/1981 | Morwood | 224/150 |

*Primary Examiner*—Donald A. Griffin

[57] ABSTRACT

A camera hold steady strap composed of elastic stretch fabric having a certain amount of "give" which acts as a shock absorber when a hook having a base pivoted to the lower end of an adjustable loop formed by a portion of the strap is connected to the user's belt with the so pivoted base of the hook located behind and slightly above the top of such belt. Thus, when the strap is looped over the belt top, as when the camera falls or depends below the belt, or the camera is pulled away from the user by a camera snatcher, the hook is locked on the belt by the strap overlapping the belt top. The strap also serves as an elastic hold down link to the user's belt, for the camera, when carried by the user's camera neck strap; so that the "give" in the elastic stretch fabric permits the user to jog, etc. without damaging the camera. The "give" in the strap also enables the user to take pictures with the camera either horizontal or vertical without having to adjust the strap length.

1 Claim, 7 Drawing Figures

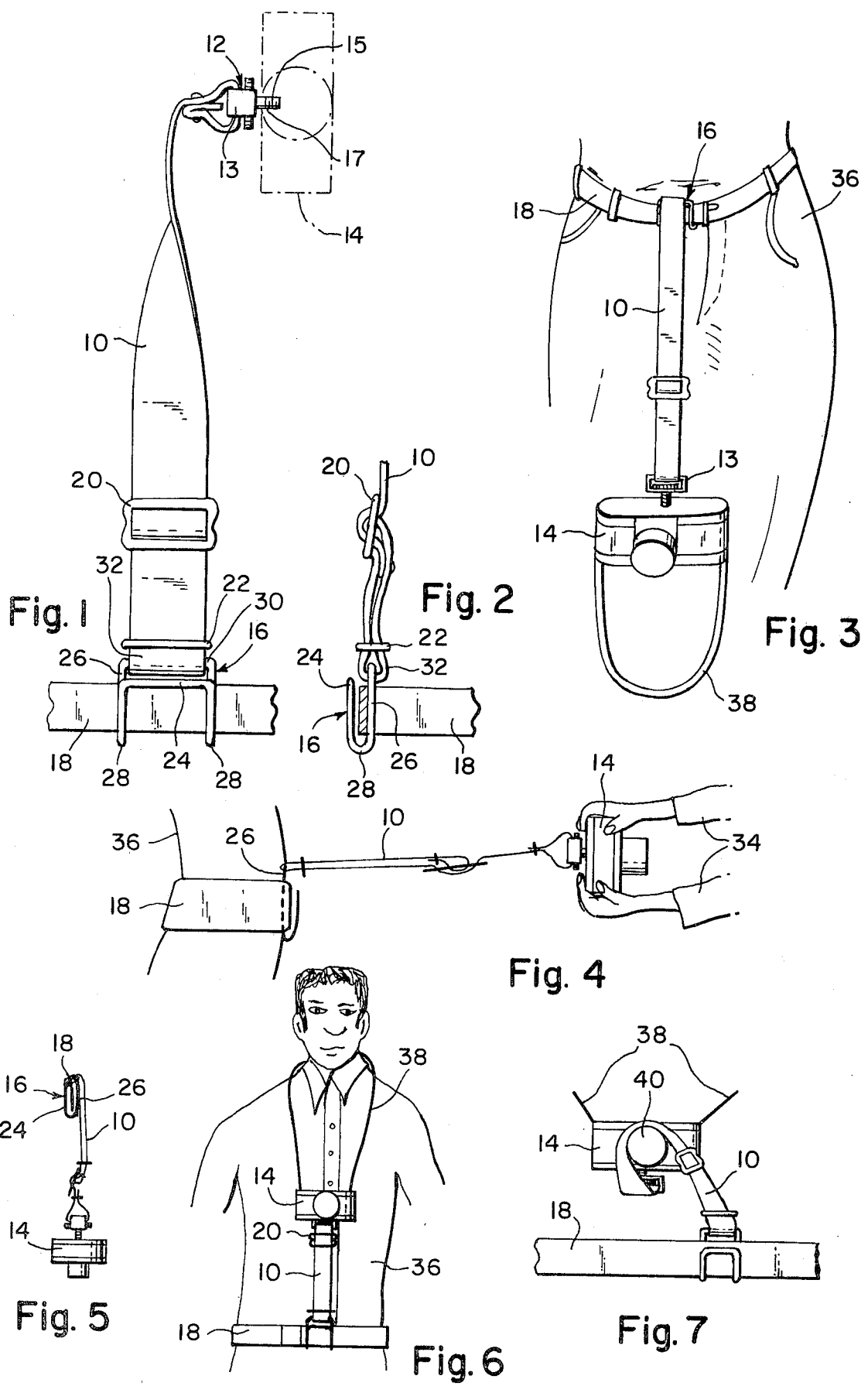

HOLD STEADY STRAPS

BACKGROUND OF THE INVENTION

This invention relates to hold steady camera straps, and more particularly to waist length straps.

In my U.S. Pat. No. 4,155,636, dated May 22, 1979, there is disclosed a hold down strap having a buckle for length adjustment, an elastic on one end of the strap being connected to a camera, and the other end of the strap having either a belt hook or else a foot stirrup. (Int. Cl² A44B 21/00; G03B 17/00; U.S. Cl. 354/293; 24/73R.

My copending U.S. Pat. application, Ser. No. 6/109,655, filed Jan. 4, 1980 and now U.S. Pat. No. 4,266,867, issued May 12, 1981 (GRP Art Unit 211), discloses a non-elastic belt strap which can be hooked to a waist belt, or to an extension non-elastic strap having a foot stirrup.

The waist length, or foot length strap of my patent No. 4,155,636, which includes a relatively short length of elastic tape which is stitched to one end of the elongated fabric member forming the rest of the strap, is relatively expensive to make, while the waist strap of my co-pending application is composed of flexible material that is non-elastic.

The main object of this invention is to provide a waist length hold down strap that is inexpensive to make.

Another object is to provide a hold down strap that can be stretched throughout its length to a certain extent so that a camera can be effectively held steady in either a vertical or a horizontal position without adjusting the buckle position.

A further object is to provide a hold down strap that stretches to a certain extent throughout its length, to avoid adjusting the buckle, for accommodating photographers of different eye-to-waist lengths.

A further object is to provide a waist length hold down strap that can be used as a security and or safety tether connecting the camera to a photographer's belt.

An additional object is to provide a longitudinally flexible hold down strap that can be shortened with the length adjustment buckle and looped under and over a photographer's belt to form a camera carrying loop having some gentle elasticity to prevent any damage to the camera when the carrier jogs, runs, or rides horseback, or bicycles.

SUMMARY OF THE INVENTION

A waist hold down strap is composed of stretch fabric throughout its length, so that the strap is elastic to a certain extent, whereupon it ceases to be elastic, but freely returns to its original length upon release after being so stretched. The upper end of the strap is attached to a flat ring having a captive thumbscrew adapted to be threaded to the (tripod) socket in a camera at the bottom, or side thereof.

The lower end of the strap is provided with a hook opening upwardly for hooking the belt of a user from the inside, so that the strap automatically loop over such belt should the camera fall from the user's hands, saving the camera from falling to the ground. In case a camera snatcher trys to take the camera unlawfully from the user, the strap acts as a security tether which stops stretching when pulled to a certain extent.

The strap is provided with a length adjusting buckle so that the effective length of the strap can be adjusted to fit the wearer's waist length, or shortened to convert the strap into a relatively short flexible handle for carrying a camera. The hold steady strap is made of the same elasticized stretch material throughout its length to save in the cost of manufacture thereof, but this also improves the function and provides additional benefits, such as taking sharper photographs.

BRIEF DESCRIPTION OF THE DRAWING FIGURES

FIG. 1 is a view in elevation of a hold steady stretch strap twisted for connection to one side of a camera, illustrative of the invention.

FIG. 2 is a fragmentary view in side elevation showing how the hook is connected back of a waist belt.

FIG. 3 is a view in front elevation showing how the strap hangs over the belt and supports the camera in case the camera should inadvertently fall from the user's grasp.

FIG. 4 is a view in side elevation showing how the camera is secured to the user during an attempted robbery of the camera by a snatcher.

FIG. 5 is a view in side elevation showing the strap shortened for toting on a wearer's belt.

FIG. 6 is a view in front elevation showing a hold steady stretch strap anchoring a camera carried by a neck strap, to the wearer's belt.

FIG. 7 is a fragmentary view similar to FIG. 6 in which the stretch strap is looped over the camera lens box.

DETAILED DESCRIPTION OF THE DRAWINGS

As shown in FIG. 1, hold steady stretch strap 10 is provided with a swivel attachment, 12, consisting of a flat ring 13 provided with a freely rotatable screw 15 connected to a camera socket 17 for connection to a camera 14 at the upper end, and with a hook 16 to provide a unique connection to the photographer's belt. The strap 10 is also provided with a sliding buckle 20 for adjusting the effective length of the strap, and with a flat ring keeper 22 between the buckle 20 and the belt hook 16.

The hook 16 consists of wire bent to form an inverted U-shaped outer portion 24 adapted to be positioned on the outer side of the belt 18, and an inverted U-shaped inner portion 26 connected to said inner portion by arcuate bottom portions 28, 28. The base 30 of the hook portion 26 is carried by a loop 32 of the strap 10, which is closed about the base 30 by the keeper 22. The hook 16 is connected under the belt 18 in such a way that the inner portion 26 thereof is back of the belt 18. Thus, should the camera 14, FIG. 3, slip from the user's hands, it is prevented from falling to the ground by the stretch strap 10, which acts as a safety tether to the belt 18, by looping over the belt, thereby locking the hook 16 on the belt 18.

Connecting the hook 16 with the U-portion 26 in back of the belt 18, also locks the hook 16 on the belt 18 in case a camera 14 snatcher 34 trys to pull the camera 14 away from the owner 36 in a robbery attempt. In this case the strap 10 acts as a security tether for the camera 14. The elasticity of the strap 10 for one that is about 9–10 inches long, is about 2–3 inches, so that when the pull reaches 11–13 inches, the strap becomes non-elastic. Such "give" in the strap provides a shock absorbing effect, saving the owner's belt and the camera from damage, but holding it securely attached.

Such limited stretch of the strap 10 also permits a certain amount of elastic stretch or "give" adjustment in the effective strap length without having manually to reposition position the slide buckle 20, when the camera 14 is changed to a horizontal from the vertical picture taking position, FIG. 1.

In FIG. 5, the strap 10 is shown adjusted to its minimum length, so that the camera 14 can be suspended from the waist belt 18 for carrying the camera 14. In this case too, the turning of the strap 10 over the belt 18 and outer portion 24 of the hook 16 locks the hook 16 on the belt 18. Also, the available elastic stretch or "give" of the strap 10 cushions any damaging jolts the camera 14 might otherwise receive.

In FIG. 6, the camera 14 is stretch anchored between a neck strap 38 worn by the wearer 36, and the waist belt 18 strap-link 10. In this case too the stretch strap 10 may be shortened by adjustment of the slide buckle 20 to fit the wearer's neck-to-waist meansurement, leaving the wearer 36 free to jog, run, exercise, ride horseback, a bicycle or motorcycle, without fear of damage to the camera 14.

In FIG. 7, a similar result is accomplished by looping the strap 10 over the lens projection 40 of the camera 14, neck strap 38, to effectively shorten its link length to the belt 18.

What is claimed is:

1. A hold steady strap assembly for a camera user having a belt, comprising
   a longitudinal strap composed of woven elastic stretch fabric material that can be stretched longitudinally to a certain extent whereupon it becomes non-elastic yet returns to its original length when released,
   a sliding buckle attached to one end of said elastic strap and slidable on an intermediate portion thereof so as to form an adjustable loop at the lower end of said strap,
   a flat ring attached to the upper end of said strap, provided with a freely rotatable screw to fit a camera threaded opening, and
   a hook having a base carried by said loop at the lower end of said strap, adapted to fit under the user's belt with said base located behind such belt so that the strap loops over the top of said belt when the strap is pulled forwardly or downwardly with respect to such belt, locking said hook on such belt, in which said strap also serves as an elastic hold down link between the user's belt and the camera when carried by a camera neck strap by the user, permitting the user to jog, exercise, run or ride a bicycle or motorcycle, or a horse, without damaging the camera by virtue of the "give" afforded by the elasticity of said hold down link.

* * * * *